Patented July 19, 1927.

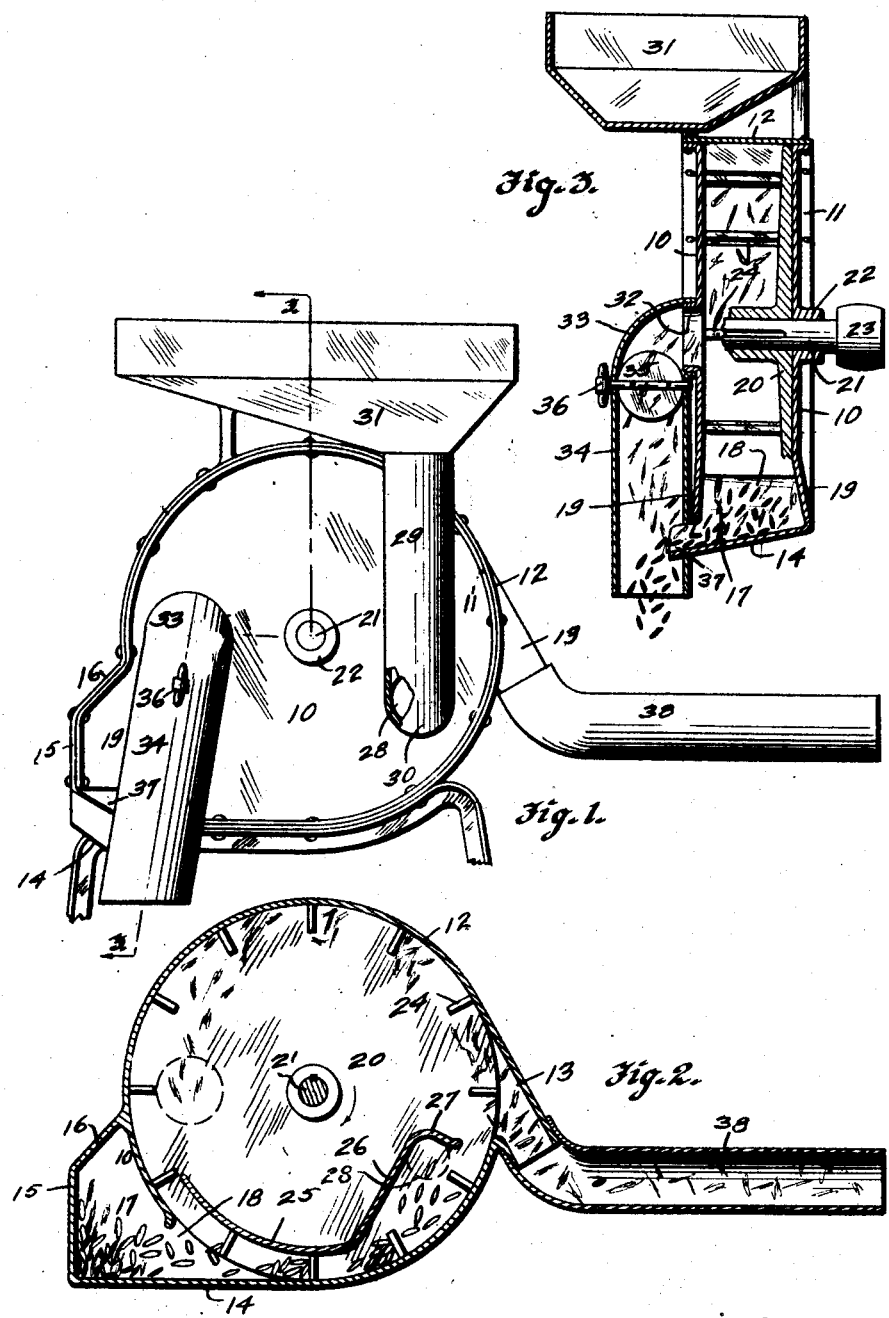

1,636,309

UNITED STATES PATENT OFFICE.

FREDERICK LAGE, OF GLADBROOK, IOWA.

OAT HULLER.

Application filed April 7, 1924. Serial No. 704,706.

The object of my invention is to provide a new and improved method of removing the hulls from the kernels of oats and similar grain.

A further object is to provide a mechanism for removing hulls from the kernels of oats and similar grain, carried out by my improved method.

More specifically it is the object of my invention to provide an oats huller of simple, durable and inexpensive construction, which will automatically remove the hulls and separate them from the kernels.

Another object of my invention is to provide an oats huller which may be used either for hulling oats or for grinding the same.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved oat huller.

Figure 2 is a vertical sectional view of the same.

Figure 3 is a transverse sectional view taken on the line 3—3 of Figure 1.

My improved method of hulling oats and similar grain consists in first feeding a substantially uniform quantity of grain at a comparatively slow speed, then suddenly bringing the grain to a high velocity by being brought in contact with a rapidly moving solid member, such as an iron or steel plate, and discharging the same in such a manner that it will be brought, while at the high velocity, in contact with a stationary plate. The velocity of the moving member and of the grain is sufficient to separate the hulls from the kernels by impact.

The mechanism for carrying out my improved method is as follows:

The numeral 10 indicates the outer casing members which are formed substantially circular and spaced apart. Each of the said members 10 is provided with an outwardly extending flange 11 which is provided with a casing 12. One side of the casing 12 is provided with a spout 13 arranged in a tangent manner, the outer side being provided with an extension 14 formed tangently with the member 12 and extending beyond the edge of the members 10 a considerable distance.

The outer end of the member 14 is provided with an upwardly extending separating plate 15, the upper end of which is provided with an inwardly extending portion 16 secured to one side of the member 12. The members 14, 15 and 16 form a separating compartment 17 which communicates with the interior of the casing 10 by means of an opening 18. The side members 10 are provided with projections 19 to form ends for the compartment 17.

Adjacent to one of the head members 10, I have provided a disk 20 mounted on an axle 21 which in turn is rotatively mounted in suitable bearings 22. The outer end of the axle 21 is provided with a pulley wheel 23. The disk 20 is provided near its periphery with a series of laterally extending blades 24 which extend transversely across the space between the members 10, as clearly shown in Figures 2 and 3.

Secured to the inner face of the opposite disk 10 is an inwardly extended and curved plate 25 which rests in front of the opening 18 and adjacent to the inner edges of the blades 24. The plate 25 is provided with a inwardly extended portion 26 which terminates in an outwardly extending portion 27. The said portion 27 is located above the inlet opening 28 near the spout 13. A vertically arranged spout 29 is secured adjacent to the outer face of the member 10 and is provided with a suitable elbow 30 communicating with the opening 28. The upper end of the pipe 29 is connected to the lower end of a hopper 31.

In the opposite side of the member 10 I have provided an opening 32 in which is mounted an elbow 33 having a downwardly extending pipe 34 provided with a damper 35 having a handle 36. The bottom plate 14 of the compartment 17 is mounted slightly inclined toward the pipe 34 and is provided with a chute 37 which enters the pipe 34 near its lower end. The outer end of the discharge pipe 13 is provided with a conveyor pipe 38 which may be supported in such a manner that the hulls may be carried to any desired point.

It will be seen that if rotation is imparted to the shaft 21 through the belt wheel 23, the disk 20 will be rotated and the blades 24 caused to travel between the plate 25 and the member 12 and the opening 18. The said blades entering between the outer end of the member 27 and the outer casing 12. It will be seen that if the said shaft and the member 20, together with the blades 24, are rotated at a speed of about two thousand revolutions per minute and that if the hopper 31 is filled with grain, which will be gradually discharged through the pipe 29 into the openings 28 and from there against the blades 24 beneath the plates 25 and 26, it will then be thrown against the plate 15 through the opening 18 with such violence that the hulls will be seperated from the kernels. The hulls and kernels will then slide outwardly through the chute 37 into the pipe 34.

It will further be seen that the rapid rotation of the blades 24 will cause a suction in the pipe 34 and the hulls will be drawn upwardly into the compartment between the members 10, and will be discharged through the chute 13. The kernels, being heavier than the hulls, will drop and be discharged through the lower end of the pipe 34 into a suitable container beneath, while the hulls will be discharged through the pipe 38 and carried to any desired point. This provides means whereby the hulls may be quickly removed from the kernels of grain.

If it is desired to coarsely grind or pulverize the kernels, this may be done by placing them in the hopper 31 and again running them through the machine at approximately the same speed, in which case the finely ground grain will be discharged through the spout 13.

The proper separation between the kernels and the hulls may be regulated by means of the damper 35. If the said damper is left entirely open, the draft will be great enough to pull both the kernels and the hulls upwardly through the pipe 34, and by partially closing the damper 35 proper suction may be maintained in the pipe 34, so that complete separation may be provided between the kernels and the hulls, or the damper may be readjusted in such a manner that the very light kernels will be carried over with the hulls and thereby provide means whereby the good kernels will be separated from the lighter ones, or when being used as a grinder, the damper 35 may be so adjusted that when the kernels have been run through the huller, the second time, all of them may be discharged through the spout 13, or if it is desired to do a finer grade of grinding, the damper may be so adjusted that the heavier particles will fall through the lower end of the spout, while the lighter ones are drawn upwardly, in which case the coarser particles may be again fed through the grinder. By this means a very fine grade of grinding or pulverizing may be accomplished.

Thus it will be seen that I have provided a combined huller and pulverizer of simple, durable and inexpensive construction, which may be economically operated at a very low power consumption.

I claim as my invention:

1. In a device of the class described, a hopper for delivering grain in predetermined quantities, a stationary separating plate, a vertical pipe to receive separated grain from said plate, rotating blades for producing a current of air upwardly through said pipe and operatively connected therewith, means for receiving grain from said hopper and delivering it to said blades, said grain being delivered from said blades in a tangent manner into perpendicular engagement with said plate.

2. In a device of the class described, a hopper for delivering grain in predetermined quantities, a stationary separating plate, a vertical pipe to receive separated grain from said plate, rotating blades for producing a current of air upwardly through said pipe and operatively connected therewith, means for receiving grain from said hopper and delivering it to said blades, said grain being delivered from said blades in a tangent manner into perpendicular engagement with said plate, and means in said vertical pipe for regulating the flow of air therein.

3. In a device of the class described, a support, a casing, a series of fan blades rotatively mounted in said casing, said casing being provided with a delivery chute in communication with its interior, said casing also being provided with a separating compartment having an opening communcating with its interior, said separating compartment having one side tangent with the periphery of said casing and a plate substantially at right angles to the first said side member, said rotating blades being designed to travel adjacent to the periphery of said casing, a stationary division plate adjacent to the inner edges of said rotating blade and over the opening in said separating compartment, means for delivering grain to the under side of said division plate and into contact with said rotating blades, a vertical tube adjacent to one side of said casing and in communication therewith, and means for communicating the separating compartment with said vertical tube.

4. In a device of the class described, a support, a cylindrical casing, a disk rotatively mounted in said casing having a series of laterally extending blades, said casing being provided with a delivery chute communicating with the interior of said casing and arranged tangently therewith, said casing also being provided with a separating compartment having an opening communicating with the interior of said casing, said separating compartment having one side tangent with the periphery of said casing and a plate at substantially right angles to the first said side member, the laterally extending blades being designed to travel adjacent to the periphery of said cylindrical casing, a stationary division plate adjacent to the inner edges of said laterally extending flanges and over the opening in said separating compartment, a hopper adjacent to one side of the cylindrical compartment, a tubular member communicating with said hopper designed to deliver grain from said hopper to the under side of said division plate and to the said laterally extending flanges of the rotary member, a vertical tube adjacent to one side of said casing and in communication therewith, means for communicating the separating compartment with said vertical tube, and a damper for said vertical tube.

Des Moines, Iowa, March 19, 1924.

FREDERICK LAGE.